Jan. 21, 1969

R. ZWICK

MOVING LIGHT SOURCE GENERATOR EMPLOYING ON ELECTROMAGNETIC FIELD

Filed Feb. 14, 1966

3,423,522

INVENTOR

RAHMIEL ZWICK

BY

ATTORNEY

United States Patent Office 3,423,522

Patented Jan. 21, 1969

3,423,522

MOVING LIGHT SOURCE GENERATOR EMPLOYING AN ELECTROMAGNETIC FIELD

Rahmiel Zwick, 7255 Central Ave., St. Petersburg, Fla. 33710

Filed Feb. 14, 1966, Ser. No. 527,364

U.S. Cl. 178—6 9 Claims

Int. Cl. H04n 7/00; H05b 31/28; H01j 23/10

The present invention relates to an electrically powered light generator for providing electrically controlled moving points or sources of light which has particular utility in systems for reproducing electrical signals, such as video broadcast signals.

The principal object of the invention is the provision of a new and improved moving light source generator for producing a series of moving sources of light which travel along a given path at a predetermined frequency rate whereby the light from the sources may be utilized with means synchronized with the light source means to reproduce pictures or other signals.

A further object of the invention is the provision of a new and improved moving light source generator which provides a source of moving light which may be modulated and diverted in an atmospheric environment to reproduce a televised picture on any suitable light reflecting screen or surface.

Still another object of the invention is the provision of a light source generator comprising two elongated electrodes arranged to support a spark therebetween when a current potential is established therebetween and an electromagnetic field generating means forming traveling magnetic fields along the electrodes which drive the spark therealong.

Other objects and advantages of the invention will be apparent from the following description of a preferred form thereof, reference being made to the accompanying drawings wherein.

Figures 1, 2:
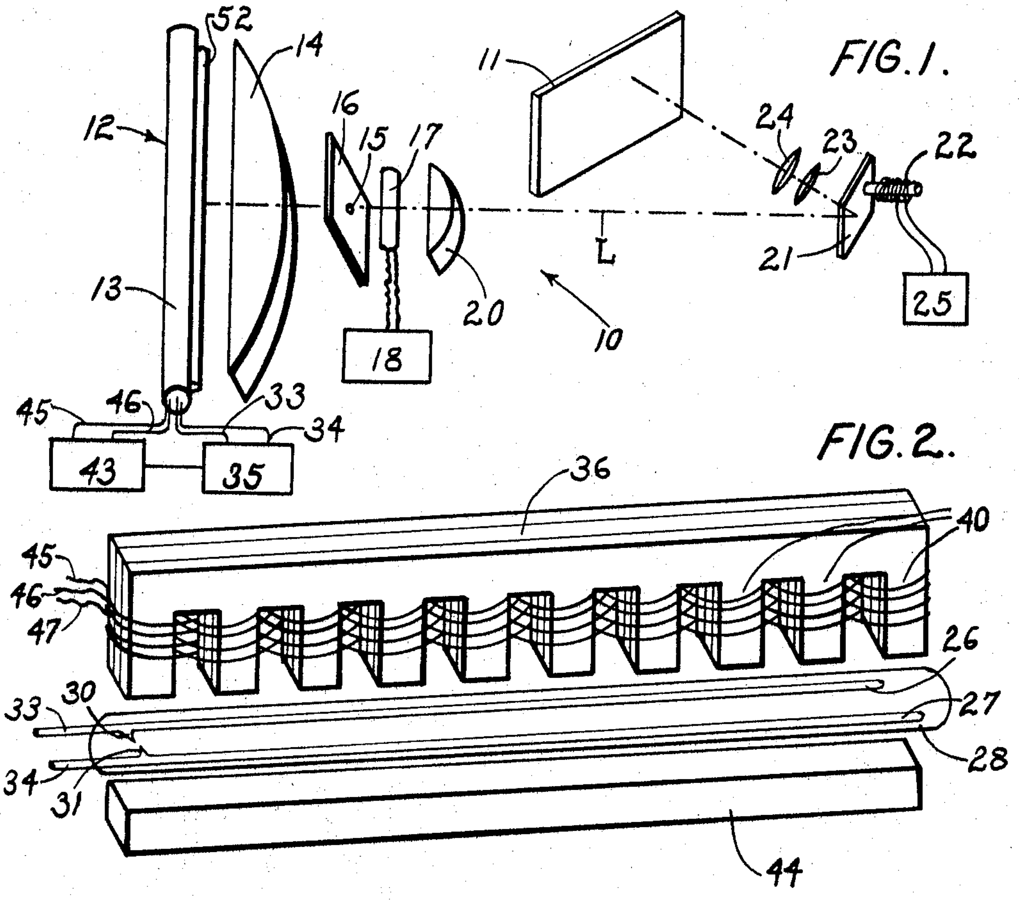
FIG. 1 is a schematic illustration of a television receiver embodying the invention.
FIG. 2 is a schematic showing of certain parts of a light generator embodying the invention.

Referring to FIG. 1, an apparatus 10 is shown for reproducing a broadcast video picture on a screen 11 thereof. In general the apparatus comprises my new and improved light generator 12 which produces successive electric sparks which move in a line substantially from one end to the other of a horizontally disposed electrode enclosure casing 13, the frequency of the individual sparks produced corresponding to the frequency of the horizontal scannings of the video broadcasting camera. In domestic television systems this frequency is 15,750 lines per second. It will be appreciated by those skilled in the art that the frequency of the light sources moving from one end of the casing 13 to the other corresponds to the frequency of the horizontal sweep of the electron beam in the cathode ray tube of the conventional television receiver.

The light rays L from each spark generated is directed through a convex lens 14 which focuses the rays L to pass through an aperture 15 in a shield 16 and thence through a conventional Kerr cell 17. The Kerr cell 17 is controlled by circuitry 18 which is similar to that employed for the control grid of the cathode ray tube of a conventional television receiver and is merely shown schematically as such circuits are well known. The Kerr cell 17 modulates the intensity of the light beam in accordance with the broadcast television signals and the modulated beam is then directed through a focusing lens 20 and onto a mirror 21. The mirror 21 is arranged to be vibrated by an electromagnet 22 about a horizontal axis so as to reflect the beam of modulated light up and down onto the screen 11, through suitable lenses 23, 24. The electromagnet 22 is driven by a vertical amplifier circuit 25 which is similar to that of a convventional television receiver so that the vertical shifting of the light beam on the screen 11 by the mirror 21 corresponds to the vertical scanning frequency of the broadcast signals. It will be appreciated that the horizontally and vertically moving light beam, modulated in intensity and synchronized with the horizontal and vertical scanning signals of the video broadcast, as just described, produces a picture on the screen 11.

The surface of the screen 11 may be of any suitable light reflective material such as that commonly used on screens onto which motion pictures are projected and the screen need not be enclosed.

An important feature of the apparatus 10 is the light generator 12 which produces sharp, individual light sources which move across a horizontal path in correspondence with the horizontal scanning of the video broadcast system, the light sources originating at one end of the electrode casing and terminating at the other end. The successive sparks move in a line frequency corresponding to the frequency of the horizontal scanning of the broadcasting transmitter, which in the usual domestic video broadcasting system is 15,750 lines per second.

The generator 12 comprises a pair of rod-like metal electrodes 26, 27 which are sealed in a transparent cylinder 28, which preferably contains Xenon gas or a mercury vapor to enhance the brillance of the sparks. The left hand ends of the electrodes 26, 27 have parts 30, 31 which extend closer to one another than the remainder of the electrodes to cause a spark to be initiated at this point when a suitable electrical potential is applied between the electrodes.

The left hand end of the cylinder 28 is closed by a cap through which leads 33, 34 extend which are connected with circuitry 35 for providing a potential between the electrodes suitable for establishing a spark therebetween, and which potential is interrupted at frequencies corresponding to the blanking intervals of the conventional video receiver, i.e. 15,750 c.p.s. The potential required to strike a spark between the electrodes 26, 27 will be considerably below the voltages employed in conventional video receivers for establishing the electron beam in the cathode tube. The circuitry 35 is not shown because of its similarity to well known corresponding circuitry for controlling the establishment, maintenance and blanking out of the electron beam in the cathode tube of a conventional video receiver, except that the voltage output is substantially less than that of the conventional receiver.

Figure 4:
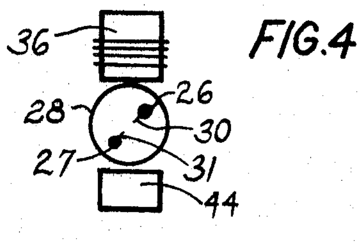
FIG. 4 is a fragmentary end view of the parts of the light generator shown in FIG. 2.

An electromagnetic field generator comprising a comb-shaped stator 36 is positioned adjacent the envelope 28 and is coextensive with the electrodes 26, 27, the electrodes lying in a common plane which extends at about 45° with a vertical plane through the median of the stator, as seen in FIG. 4. The stator 36 has teeth or pole pieces 40 which are spaced apart to receive two sets of windings 41, 42 which are wound on the pole pieces in a manner to induce a pulsating magnetic field in the form of waves of increasing and decreasing flux density which move from the left hand end of the stator to the right hand end when the windings are subjected to a two phase pulsating current from the horizontal output circuit 43, which output circuit produces a voltage potential of a character similar to that of the horizontal output of a conventional television receiver. A magnetic flux bar 44 is disposed alongside the envelope 28 opposite the outer ends of the pole pieces 40 and serves to form a return path for the flux.

The stator 36 and bar 44 may be formed of laminations of iron plates as is usual in forming transformer and motor stators.

It will be seen that the moving waves of magnetic flux generated by the windings and stator will extend in the plane of the vertical median through the stator and that the path between the electrodes which is free or substantially free of magnetic flux will be most favorable for transmission of a spark. Consequently, when the flux waves move along the electrodes 26, 27 the path of least resistance to the electrons forming a spark struck between the parts 30, 31 is that area existing from instant to instant between two flux wave peaks as they travel from the left hand end to the right hand end of the electrodes and consequently each spark generated will move at the speed the magnetic flux waves move.

Figure 3:
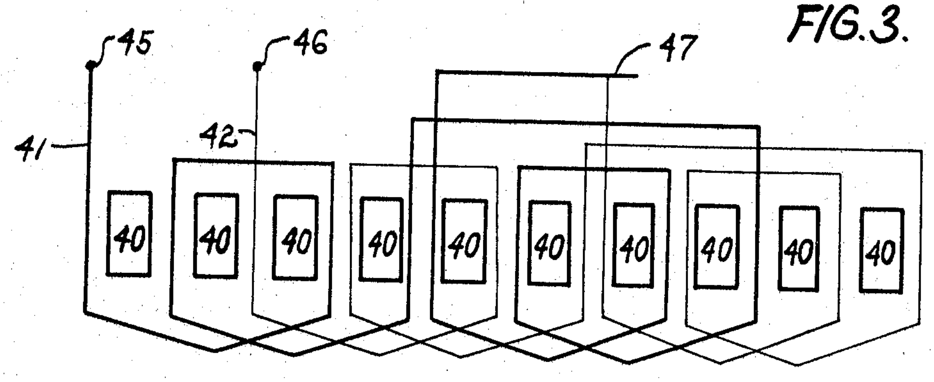
FIG. 3 is a schematic drawing of windings of an electromagnetic spark driver for the light generator.

The stator 36 has ten pole pieces 40 and the configurations of the windings are a two pole, two phase, three-quarter pitch. The number of turns per coil is that sufficient for the available power supply and the field required. In FIG. 3, the configuration of the windings is illustrated with the heavy lines indicating winding 41 and the light lines indicating winding 42. One terminal 45 of winding 41 is connected to one phase of the two phase supply horizontal output 43, and the terminal 46 of the winding 42 is connected to the second phase of the horizontal output with the other ends 47 of the windings common. The two phase current supply to the windings provides a sinusoidal flux field which will sweep from the left hand end to the right hand end of the stator once per cycle of the input voltage.

As mentioned previously, the terminals 33, 34 of the electrodes 26, 27 respectively are connected to the circuitry 35 which is synchronized with the circuit 43, which is the current source for the windings 41, 42 in a manner similar to that of the conventional video receiver so that a spark will be struck at the closely positioned parts 30, 31 of the electrodes at the beginning of each magnetic field sweep, and a spark once struck will be carried by the magnetic field, as described hereinbefore, to the other end of the electrodes where it is extinguished during the blanking interval, and a new spark is then generated at the parts 30, 31 of the electrodes and this cycle is repeated. The traveling sparks move at a uniform rate and produce a bright light.

The stator 36, envelope 28 and flux bar 44 are enclosed in the cylindrical shield-like casing 13 which has a longitudinal slot in one side thereof in which a cylindrical lens 52 is located for concentrating the light rays from the sparks onto the lens 14. The inside of the casing 13 is preferably formed to effectively reflect the light from the sparks onto the lens 52.

It will be apparent that by my invention, a source of moving light of a controlled, exceedingly high frequency and rate is provided in a relatively inexpensive and simple manner. The frequency of the light may be exceedingly high and has utility in reproducing pictures, for example, without the use of cathode ray tubes and the like, so that reproduction of televised pictures can be achieved by relatively small, inexpensive devices and can produce large size, quality pictures on any ordinary light reflective surface. The usual cathode ray tube and its attendant disadvantage such as high voltages, electron guns, electronic focusing, blanking of retrace, etc., are eliminated.

Other advantages arising from the novel light source generator will suggest themselves to those skilled in the art, and while but one form of the invention has been described in detail, other forms, modifications and adaptations thereof may be made, all falling within the scope of the claims which follow.

I claim:

1. A light generator comprising a first elongated electrode, a second elongated electrode disposed relative to said first electrode to enable an electric spark to be established along a substantial length of said electrodes, means to impose an electric potential between said electrodes to establish a spark between said electrodes, and electromagnetic means to provide a magnetic field along said electrodes, said magnetic field moving along said electrodes to drive a spark therealong.

2. A light generator as defined in claim 1 having means to initiate a spark at a given position along said electrodes.

3. A light generator as defined in claim 2 in which the last mentioned means includes a relatively short portion of one of said electrodes being closer to the other of said electrode than contiguous substantial portions thereof.

4. A light generator as defined in claim 1 in which said electromagnetic means includes a stator extending along said electrodes and spaced therefrom, and wire windings on said case adapted to establish a moving magnetic field along said electrodes.

5. A light generator as defined in claim 1 including means to reflect light from sparks between said electrodes in a concentrated area.

6. A method of reproducing televised pictures and the like which comprises, successively establishing a spark between two elongated electrodes, and driving the spark along the electrodes to provide successive sources of light moving from one position to another position at a rate and frequency corresponding to the horizontal scanning component of a raster, passing the light from the spark into association with a light intensity modulating means synchronized with the picture signal of a television receiver, projecting the modulated beam onto a beam deflector means controlled to direct the beam in synchronism with the standard vertical scanning rate of the television receiver, and projecting the beam from said deflector means onto a screen.

7. Mechanism for reproducing images comprising first and second elongated electrodes disposed relative to one another so as to permit an electric spark to be drawn therebetween, means to impose an electric potential between said electrodes to establish a spark therebetween, electromagnetic means for establishing a magnetic field adapted to move along said electrodes and cause a spark drawn between said electrodes to travel therealong, means to modulate the intensity of a beam of light rays from the traveling spark, and means to reflect said modulated light rays onto a screen or the like.

8. A mechanism as defined in claim 7 further characterized by said electrodes extending so as to cause a spark traveling therealong to move in a straight line, the last mentioned means to reflect said light rays comprising means to reflect a beam of said rays onto said screen and to move the reflected beam of rays in directions extending generally normal to the direction of movement of the beam of light rays impinging on said reflector means.

9. A mechanism as defined in claim 7 further characterized by means to control the frequency of the establishment of said potential between said electrodes, means to control the frequency of travel of said magnetic field from one position to another on said electrodes, means to synchronize the last two mentioned means to cause said magnetic field to move a spark from one position to another on said electrodes, and means to synchronize the modulations of said light rays and the movement of said reflected light rays to provide a defined image on said screen.

References Cited

UNITED STATES PATENTS

| | | | |
|---|---|---|---|
| 1,779,747 | 10/1930 | Nicolson | 178—7.5 X |
| 2,213,070 | 8/1940 | Farnsworth | 178—6 |

ROBERT L. GRIFFIN, *Primary Examiner.*

BARRY LEIBOWITZ, *Assistant Examiner.*

U.S. Cl. X.R.

314—20; 313—161